Figure 1:
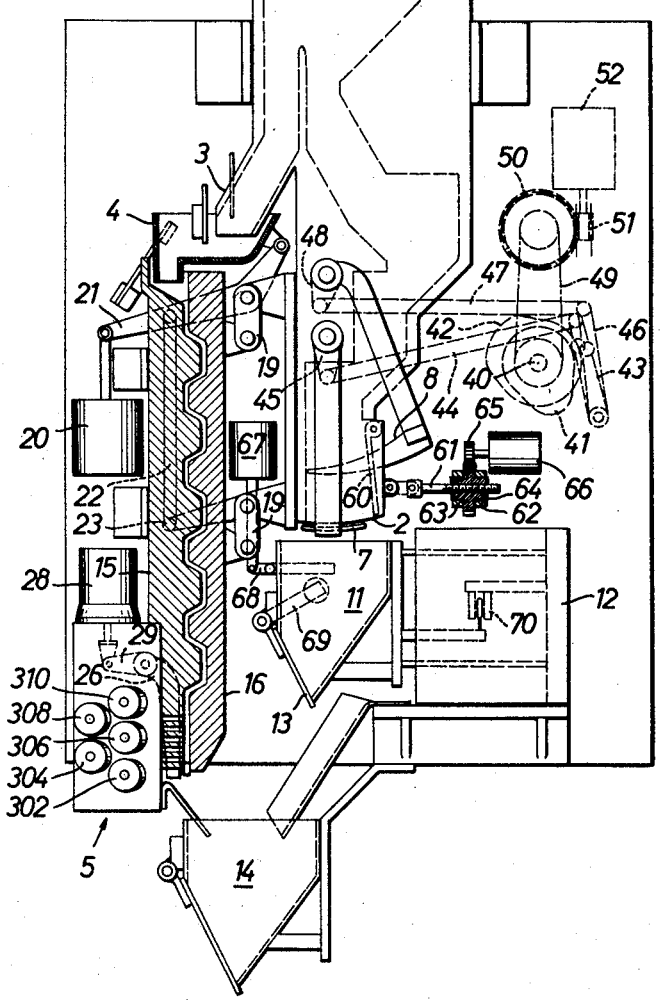

June 2, 1964  A. STAMBERA  3,135,343
APPARATUS FOR WEIGHING OUT COMMODITIES
OF STICK FORM, SUCH AS MACARONI
Filed Oct. 19, 1960  4 Sheets-Sheet 1

United States Patent Office

3,135,343
Patented June 2, 1964

3,135,343
APPARATUS FOR WEIGHING OUT COMMODITIES OF STICK FORM, SUCH AS MACARONI
Adolf Stambera, Stuttgart-Bad Cannstatt, Germany, assignor to Firma Fr. Hesser Maschinenfabrik-Aktiengesellschaft, Stuttgart-Bad Cannstatt, Germany, a corporation of Germany
Filed Oct. 19, 1960, Ser. No. 63,687
Claims priority, application Germany Oct. 21, 1959
14 Claims. (Cl. 177—52)

The invention relates to apparatus for weighing out material or commodities of stick form. More particularly, the apparatus is adapted to weigh out quantities of macaroni.

In the conventional weighing out of macaroni or like sticks, a quantity of the sticks less than a predetermined target weight is first fed to a weigh holder or pan by a dispensing device, and then further sticks of macaroni are subsequently fed in one after another by a further feed device until the target weight is reached. The period of time taken up by the weighing out operation here depends on the magnitude of underweight in the pre-dispensed quantity of the material, since the sticks of macaroni which are required to make up the weight are fed at a uniform number of pieces per unit of time.

This method of weighing with a so-called fine feed takes a comparatively long period of time, so that only a correspondingly small total number of weighing operations can be performed per unit time. Moreover these devices do not operate with the required accuracy because, as the fine feed is shut off, one or more sticks are liable to be released and dropped into the weighing holder or pan, which may lead to overweights.

It is an object of this invention to afford a more rapid and more accurate achievement of a set target weight of a stick-like commodity.

A further object is to arrange a fine dispensing device in parallel with a main dispenser, or so-called predispenser, and to construct this fine dispensing device so that it will arrange sticks taken from the main feed into a single row; in addition provision will be made to separate from the end of this row a number of sticks corresponding to the magnitude of the underweight determined by a weigher and transfer these to the predispensed and weighed quantity.

In a preferred embodiment of the invention the fine dispensing device comprises two upright plates which interengage or interfit in toothed fashion with a certain amount of clearance forming a channel between them. A plurality of movable pins, each operated by an electromagnet controlled by the weigher, are arranged one above another at the lower end of the channel and are adapted to be shifted, in response to energization of the associated electromagnet, against or across the path of the associated stick of the row of sticks formed up between the plates. The result is that a number of sticks of macaroni are separated in one batch from between the outlet from the fine dispensing device, which may be closed by an electrically operated trapper, and the particular pin which has been operated by the weigher, this number exactly corresponding to the underweight of the predispensed quantity of macaroni, within the tolerance afforded by the weight of one macaroni stick.

A further advantage of the apparatus according to the invention resides in the fact that the weighing periods are not only very short but may be of practically equal length, irrespective of different weights of predispensed quantities, and this is of great importance when the measuring-out device is incorporated in an automatic packaging machine.

Figure 2:
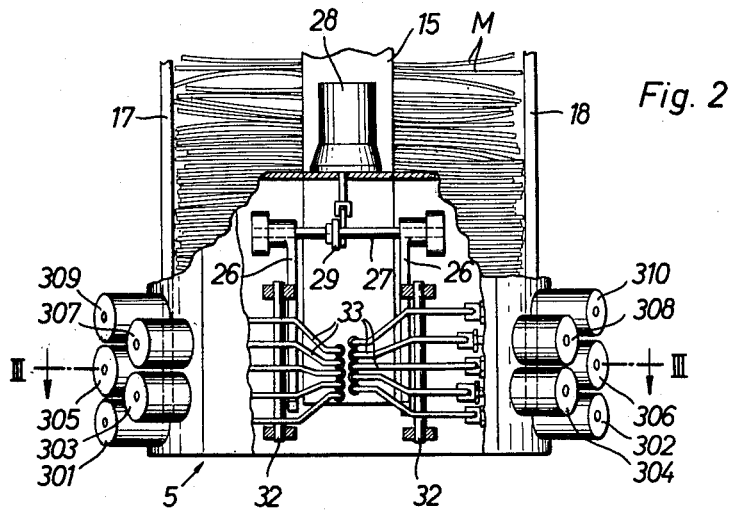
Figure 3:
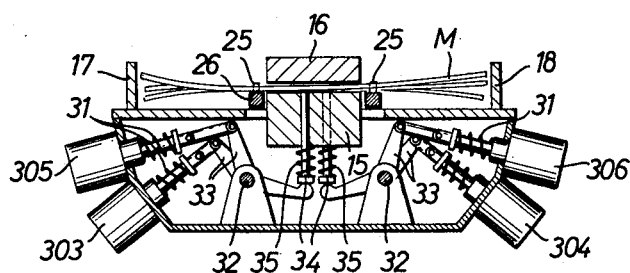
Figures 4, 5:
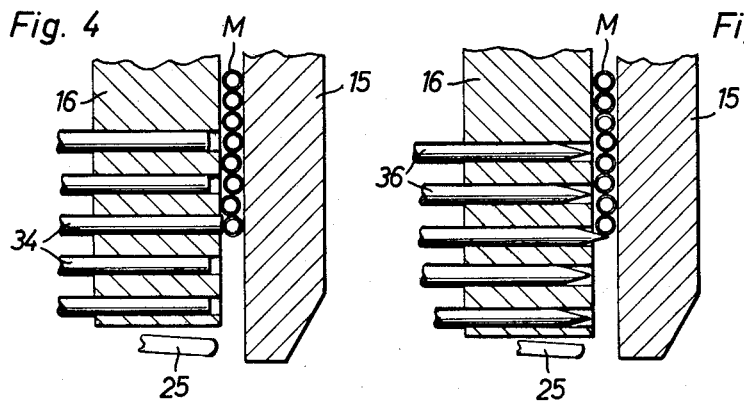
Figure 7:
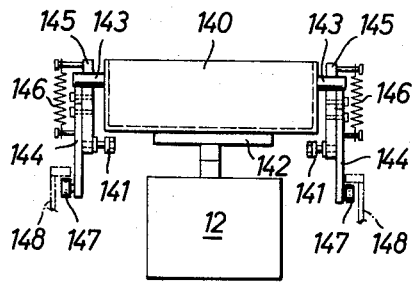
Figure 6:
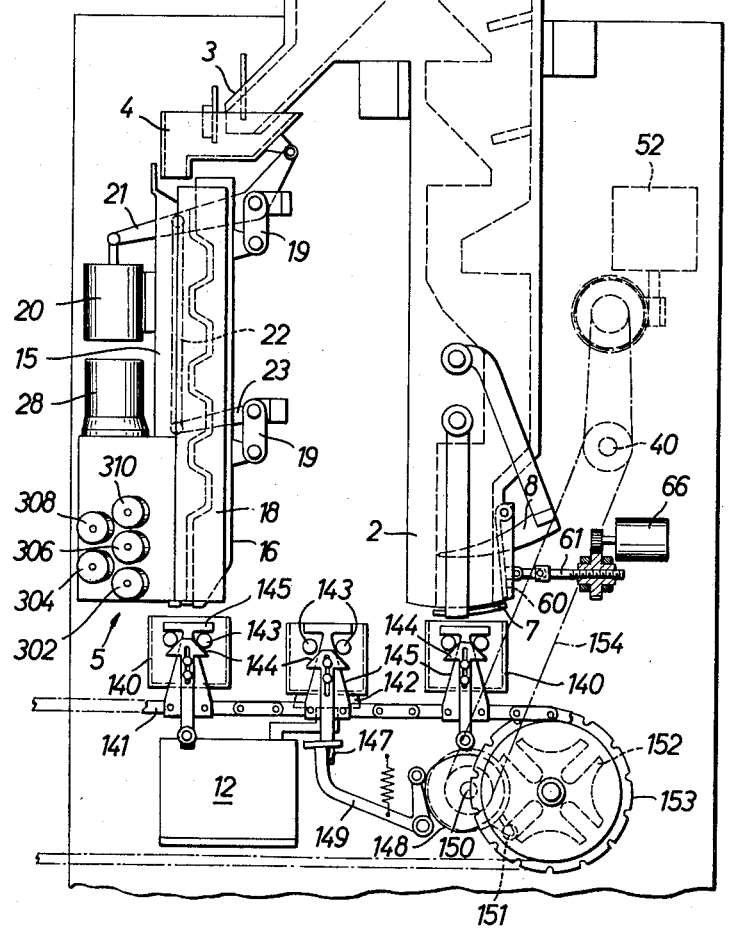
Figure 8:
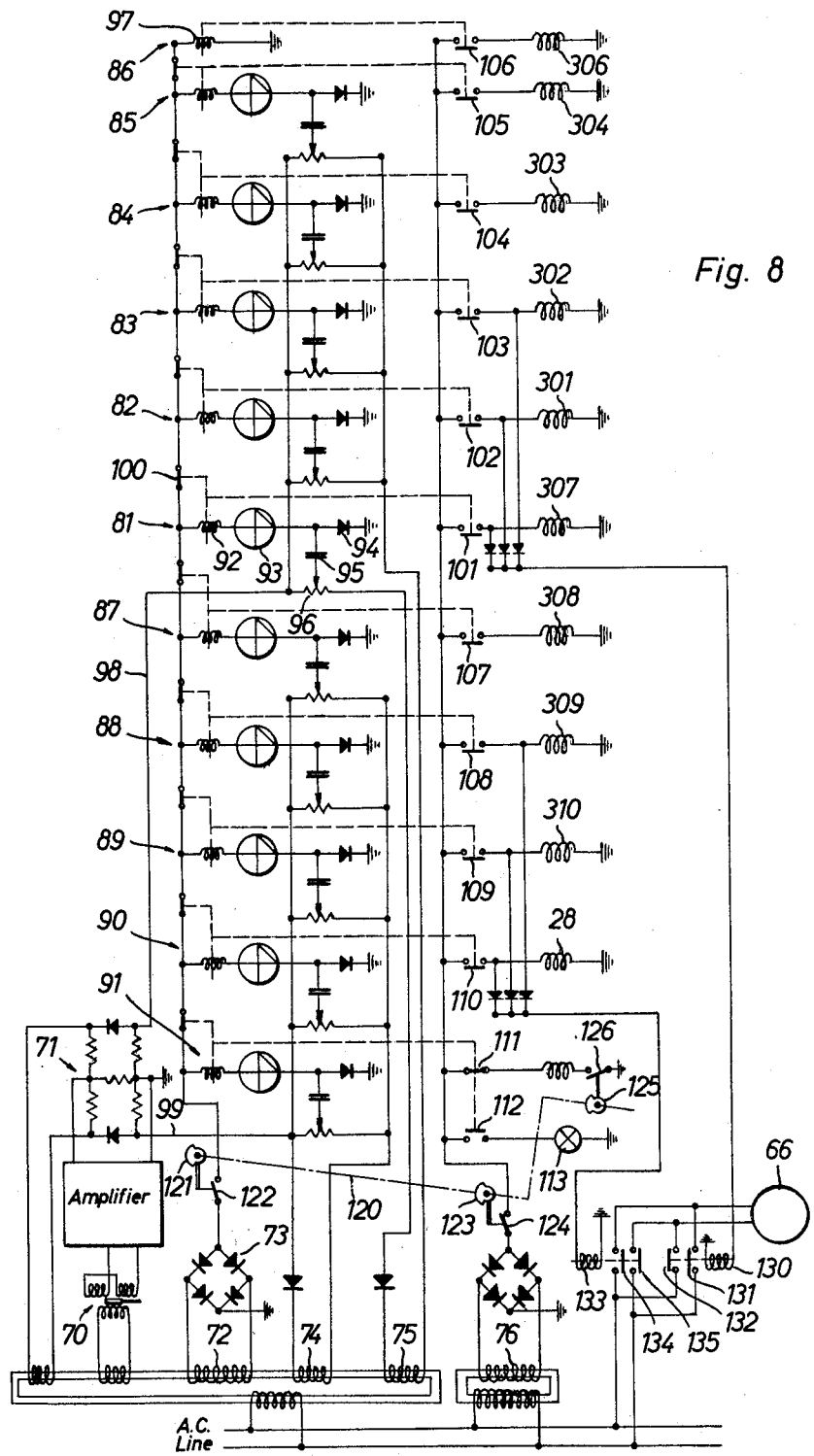

Embodiments of the apparatus according to the invention are illustrated in the drawings attached hereto, in which:

FIGURE 1 is a front view, partly in section, of a first embodiment of the invention.
FIGURE 2 is a side view of part of the embodiment in FIGURE 1.
FIGURE 3 is a section along the line III—III of FIGURE 2.
FIGURE 4 is a section through a detail, on a larger scale, of the fine dispensing device.
FIGURE 5 is a cross section of a similar, but modified, detail.
FIGURE 6 is an elevational view of a further embodiment of the invention.
FIGURE 7 is a side view of a receiver; and
FIGURE 8 is a wiring diagram for the fine dispensing device.

Referring first to the embodiment of FIGURES 1 to 4, the pieces of macaroni, which are to be weighed out by the apparatus into individual quantities of pre-determined weight, are charged into the hopper 1, whence the major part follows a zig-zag course to the tubular outlet 2 and a small proportion passes via a branch 3 and a chute 4 to a fine dispensing device.

A pre-dispenser is located at the outlet 2 of the hopper 1, and this comprises a sliding door 7 and a separating wedge 8 spaced a specific distance above this door. The door 7 and the wedge 8 are pivotally mounted on the hopper 1, or its tubular section 2, and are alternately operated so that the door 7 keeps the outlet 2 closed until the wedge 8 has swung into the tubular section 2, and vice versa. A certain amount of macaroni is separated above the door 7 in the section 2 as a result of an inward swing of the wedge 8, and during the succeeding outswing of the door 7 this amount is discharged into the weighing holder 11 of a weigher 12.

After the weighing operation, the holder 11 is emptied into a receiver 14 by opening the flap 13 thereof. This is performed by an electromagnet 67 which, by means of a lever 68, depresses an arm 69 connected to the flap 13.

The door 7 and the separating wedge 8 are operated by cam discs 41 and 42 secured to a control shaft 40 and operating the doors 7 and wedge 8 through a linkage 43, 44, 45 and 46, 47, 48 respectively. The control shaft 40 is continuously driven from an electric motor 52 through a chain drive 49 and a worm and worm wheel gearing 50, 51.

To enable the quantity dispensed to be varied, a flap 60 is pivotally arranged at one side of the tubular outlet section 2. This flap 60 is articulated to a spindle 61 which is screwed into a nut 64 mounted in bearings 62, 63. The nut 64 has an external set of teeth meshing with the pinion 65 of an adjusting motor 66. The dispensing chamber may be enlarged or reduced in size, depending on the direction of rotation of the motor 66, by pivoting the flap 60.

Normally the size of the dispensing chamber in section 2 is set so that the quantity of macaroni separated is short of the target weight, for example by six sticks of macaroni. The weigher 12, which is of the standard spring balance type with a built-in variable differential transformer 70, reproduces the underweight as a corresponding voltage output which is used to operate the fine dispensing device 5 in such a way that a number of pieces of macaroni coresponding to the short weight is added to the pre-dispensed quantity.

The fine dispensing device 5 adjoins the chute 4 and opens towards the receiver 14 into which the pre-dispensed and weighed out quantities of macaroni from the weighing holder 11 are also discharged. In the fine dispensing device the sticks of macaroni divided from the hopper 1 are lined up above one another in a kind of zig-zag or undulated channel defined between two plates 15, 16 which are formed with, in effect, cooperating spaced teeth, and by two confining bars 17, 18. The lining up of the macaroni sticks M is assisted by agitation, and for this purpose the plate 16 is rockably suspended on links 19 and vibrated by a shaker magnet 20 through a linkage 21, 22, 23 connected to the links 19. In view of the fact that the plates 15, 16 only guide the pieces of macaroni M at the central parts of the latter, even curved pieces M are gradually disposed closely side by side at this part by the agitation, so as to leave no gaps between them. The ends of the curved pieces of macaroni M then project away from the central axis (see FIGURE 3).

The sticks M are prevented from dropping out from the channel between the two plates 15, 16 by two retractible trapper slides 25 which are connected to the lower ends of levers 26. The levers 26 are mounted on a rotatable shaft 27 which can be turned through a small angle by an electromagnet 28, controlled by the weigher 12, and through a lever arm 29, so that the trapper slides 25 release the macaroni sticks M.

In each operating cycle of the machine a number of sticks of macaroni corresponding to the then-prevailing short weight of the already dispensed quantity is then released. Thus, for example, if the underweight is 18 grams and the weight of a macaroni stick is 3 grams, the seventh macaroni stick from the bottom is held in the channel defined between plates 15 and 16, and the lower six sticks drop into the receiver 14 when the trapping slides 25 are withdrawn.

The retention of a specific macaroni stick is effected by the appropriate one of the electromagnets 301–310 (in this example there are ten arranged in the fine dispensing device and controlled by the differential transformer 70 of the weigher 12), the armatures 31 of which are adapted to operate pins 34 through bellcrank levers 33 which are rotatable on shafts 32. These pins 34, which are of a diameter similar to that of the sticks of macaroni and are axially movable, are arranged one above another and in staggered fashion in two rows in the plate 15. There is a pin 34 corresponding to each of the sticks of macaroni counting from the second up to the eleventh from the bottom. The pins 34 are held in their normal position by springs 35 so that their leading ends are just to the rear of the surface of the plate 15.

When one of the electromagnets 301–310 is energized, this pushes the associated pin 34 forwards so that the latter clamps the stick of macaroni in front of it against the plate 16 and holds it, while the sticks of macaroni lined up below the held macaroni drop into the receiver 14 when the trapper slides 25 are withdrawn. This fine dispensing and transfer of the number of sticks of macaroni corresponding to the underweight coincides in time with the emptying of the weighed out quantity from the weigh receptacle 11 into the receiver 14.

Instead of clamping a stick of macaroni against the plate 15, as indicated by FIGURE 5 the sticks may be held by pins 36 which are tapered at their tips and are pushed between the individual sticks so as to block downward movement thereof.

The addition of the underweight amount is controlled by the arrangement illustrated in FIGURE 8. The voltage output from the differential transformer 70 of the weigher 12 is boosted up in an amplifier and applied to a phase-dependent electrical bridge connection 71 which separates the voltages by a phase discrimination. This is necessary because, in the present embodiment, the differential transformer 70 is arranged so as to provide a zero voltage in the event of an underweight of six sticks of macaroni, a voltage output of "negative" phase when there are more than six, and a voltage output of "positive" phase when there are less than six sticks. The amplified, separated voltage outputs pass to voltage sensitive relay units 81–91, and one of these units 81–91, which are eleven in all, is brought into circuit, in dependence on the size of the voltage impulses and their phase, to energize a magnet 301–310 or 28 associated therewith. The relay units 81–91 are arranged in the circuit of a transformer winding 72 and a rectifier 73.

Each of these relay units 81–85, 87–91, comprises a relay 92, a Shockley diode 93, a rectifier 94, condenser 95 and a potentiometer 96. The relay units are set to specific response voltages, different from one another, in each case, by means of the potentiometer 96. The Shockley diodes 93 are half conductors which switch over from a high to a lower resistance in response to the application of a specific voltage. Since the voltage from the transformer 72 is less than the response voltage, on closure of a switch 122 under the effect of a cam 121 on a cam shaft 120 which is rotating at the same rate as the control shaft 40, no current, other than that through the relay unit 86 which consists of a relay 96 only, flows through the relay units 81–85 and 87–91. This is the situation where the differential transformer 70 generates a zero voltage. The response voltage of one of the relay units is produced each time by the voltage impulse from the bridge 71 and against the voltage from a transformer winding 74 or 75. One of the relay units 81–85, 87–91, i.e. one set to this voltage, is switched in in accordance with the size of the resulting differential voltage. The relay 92 of the corresponding relay unit then closes a switch 101–110 into the circuit of a transformer 76, as a result of which one of the magnets 301–310 of the fine dispensing device 5 is energized on closure of a switch 124 by a cam 123 on the camshaft 120. At the same time a switch 126 is closed by a cam 125 on the camshaft 120 so that the magnet 28 retracts the trapper slides 125.

In general, the relay units are assembled in two groups, viz. a group 81–85 for "positive" voltage impulses corresponding to an underweight of between one to five sticks of macaroni, and a group 87–91 for "negative" voltage impulses corresponding to an underweight of seven or more sticks of macaroni. The group 87–91 is connected through a line 99 to the bridge 70 and to the transformer windings 74, while the group 81–85 is connected through the line 98 to the bridge 71 and the transformer windings 75.

Further, rest contacts 100, operated by the relay 92, are connected between the individual relay units 81–91 so that when a relay unit with a higher response voltage becomes operative in each group, those of a lower response voltage are disconnected from the circuit of the transformer winding as a result of the opening of the rest contact 100 associated with the first mentioned relay unit.

If, for example, the weigher 12 detects an underweight corresponding to one stick of macaroni, the differential transformer 70 produces a voltage output of "positive" phase and this is amplified and passed from the bridge to the relay units 81–85. The size of the voltage impulse is sufficient to switch over the relay unit 81. This opens its contact 100, so that the other relay units 81–86 collapse. In addition the relay unit 81 closes the contact 101 so that the magnet 301 is energized for the period during which the contacts 122 and 124 are closed. The magnet 301 presses the second macaroni stick from the bottom against the plate 16 so that, when the magnet 28 responds and operates the trapper slides 25, only the lowermost macaroni stick drops into the receiver 14.

Correspondingly, in the event of an underweight of ten sticks of macaroni the relay unit 90 is switched in and energizes the magnet 310 so that the eleventh stick is held. If the underweight is more than the weight of ten macaroni sticks, the relay unit 91 is brought in. This closes a contact 122 which connects up an acoustic or optical signal, for example a lamp 113. At the same time a contact 111 in the circuit of the magnet 28, which operates the trapper slides 25, is opened so that the slides will not release any macaroni. The already dispensed quantity is then removed by an attendant who has observed the signal.

To prevent a tendency, in the first dispensed quantities of macaroni, towards an underweight corresponding from one to three or seven to ten sticks, the dispensing chamber in the outlet section 2 of the hopper 1 is automatically adjusted by the motor 66. On closure of contact 101, 102 or 103, a relay 30 is simultaneously energised and connects the motor 66 with the A.C. line through contacts 131, 132, until the switches 122 and 124 are closed. The motor thereby produces a specific degree of rocking of the flap 6 at the outlet 2. Correspondingly, the flap 60 is pivoted in the opposite direction when one of the relay units 88, 89 or 90 are switched over causing a relay 133 to be energized and close the contacts 134, 135.

The embodiment of the invention illustrated in FIGURES 6 and 7 shares a number of the parts and features of that described above, but in this case, instead of a single fixed receiver, a plurality of receivers 140 are provided on endless and intermittently moving conveyor chains 141. These receivers 140 are first carried beneath the outlet 2 of the first dispenser so as to receive a predispensed quantity of macaroni, then to a weighing plate 142 of the weigher 12 for the purpose of determining the amount of underweight in the first dispensed quantity, and finally beneath the fine dispensing device 5.

The receivers 140 are arranged on the conveyor chains so as to be releasable for weighing. With this in view they have at each of the narrower sides thereof two bolts 143 mounted on wedge pieces 144. The pieces 144 are mounted for vertical displacement on T-pieces 145 fastened to the chains 141. The wedge pieces 144 are pulled upwards by springs 146 so that the bolts 143 of the receivers 140 are clamped between the wedge pieces 144 and the cross members of the T-pieces. To implement the weighing, the wedge pieces 144 are pulled down on rollers 147 by means of levers 149 operated by a cam disc 148, the receiver 140 concerned then resting freely on the weigh plate 142 of the weigher 12.

The fine dispensing device in this embodiment, is constructed and arranged in exactly the same way as that described in connection with the preceding embodiment, except that the cams 123 and 125 of the camshaft 120 are appropriately shaped and set to implement the, in this case delayed, addition of the short weight quantity by the fine dispensing device 5.

The means for effecting the release of the receivers 140 for weighing the same with a pre-dispensed quantity therein, and for driving the conveyor chains 141, are operated from the control shaft 40. A chain drive 154 transmits the rotary motion of the control shaft 40 to a shaft 150 having a camshaft 148 and the driver 151 for the star 152 of a Maltese cross gearing secured thereto. The Maltese cross gearing 151, 152, drives the conveyor chains 141 intermittently through toothed wheels 153.

I claim:

1. Apparatus for weighing out material in stick form, said apparatus comprising a charging device, a main dispensing device adapted for receiving material from said charging device, intermittently-operable means to control delivery from said main dispensing device, weigher means including a holder adapted to receive material from said main dispensing device for weighing the same, a fine dispensing device also communicating with said charging device to receive material therefrom, said fine dispensing device comprising means to line up sticks of material in a single row, selectively-operable retaining members to retain variable numbers of said sticks and a trapper device; and means responsive to the weight measurement of said weigher means to select corresponding retaining members and to operate said trapper device, to simultaneously release a selected part of said row of sticks for addition to the material dispensed from the main dispensing device.

2. Apparatus for weighing out material of stick form, said apparatus comprising a charging hopper, means for delivering a measured quantity of material from said hopper, a weigher adapted to receive material delivered from said hopper, a fine-dispensing device associated with said hopper, means in said hopper for diverting a proportion of material into said fine-dispensing device, said fine dispensing device comprising guide walls defining a channel and provided with an outlet part to line up sticks of material in a single row at said outlet part of the fine dispensing device, selectively-operable retaining pins to retain individual sticks at said outlet part, and a trapper device; and means responsive to the weight measurement of said weigher to select a corresponding retaining pin and to operate said trapper device, thereby to release a selected part of said row of sticks.

3. Apparatus as claimed in claim 2, in which said means for delivering a measured quantity from the hopper comprise alternately-operable door and separator plates, and a continuously-driven cam means controlling said plates.

4. Apparatus as claimed in claim 2, in which said guide walls are furnished constituted by the opposed faces of two spaced, upright plates including alternating interfitting ribs and recesses, the retaining pins being mounted in rows of superposed, staggered bores in one of said plates at a lower, straight section of the channel between said walls.

5. Apparatus as claimed in claim 4, further including an agitating device connected to one of said plates and an electromagnet for operating said agitating device.

6. Apparatus as claimed in claim 2, comprising a linkage, an electromagnet operatively coupled through said linkage with each of said pins and selectively operable by impulses from said weigher.

7. Apparatus as claimed in claim 2, in which the trapper device includes at least one slide disposed across the outlet from said channel, and including means controlled by the weigher to retract said slide.

8. In apparatus for weighing out material of stick form, the combination of a weigher for measuring the weight of successive batches of said material, electrical means controlled by said weigher and adapted to compare a recorded weight with a predetermined weight, a make-up dispenser including retaining members controlled by said electrical means to simultaneously deliver a selected number of make-up sticks in batchwise grouping to each weighed batch to make the weight thereof equal to said predetermined weight, a make-up dispenser having a non-rectilinear channel therethrough provided with a discharge section and agitating means to orientate sticks into side-by-side alignment during their passage through this channel, the retaining members being superposed pins mounted adjacent said discharge section of said channel and movable transversely into said channel discharge section under the action of said electrical means.

9. The combination of claim 8, in which the electrical means comprises a differential transformer having a voltage output proportional to the weight measured by said weigher, discriminator means coupled to said differential transformer for acting on said voltage output, relay devices selectively responsive to said discriminator means, and electromagnetic devices responsive to said relays and operatively coupled to said retaining members.

10. In apparatus for weighing out material of stick form, the combination of a main dispenser having a dispensing chamber with an inlet and an outlet, means to alternately close said inlet and to open said outlet thereby to deliver a batch of the stick material, a weigher for measuring the weight of successive batches of said material, electrical means controlled by said weigher and adapted to compare a recorded weight with a predetermined weight and a make-up dispenser including retaining members controlled by said electrical means to prepare in advance and deliver a selected number of make-up sticks all together and at once to each weighed batch to make the weight thereof equal to the predetermined weight.

11. The combination in claim 10, further including a false wall in said chamber, and mechanical means coupled to said false wall controlled by said electrical means, to vary the effective volume of said chamber.

12. The combination in claim 10, in which the weigher includes a holder disposed to receive a measured main quantity of said stick material for weighing, and further including a receiver disposed to receive both the weighed quantity from the said holder and a make-up quantity from said make-up dispenser.

13. The combination in claim 10, further including a plurality of commodity receivers, and an intermittently-movable conveyor to transport said receivers successively from a main supply location first to the weigher for weighing and then to the make-up dispenser.

14. The combination in claim 13, further including means responsive to the travel of each receiver to a weighing location to transfer the support of said receiver from the conveyor to the weigher.

References Cited in the file of this patent

UNITED STATES PATENTS

| | | |
|---|---|---|
| 1,981,697 | Hartmann | Nov. 20, 1934 |
| 2,385,233 | Robinson | Sept. 18, 1945 |
| 2,470,916 | Carruthers | May 24, 1949 |
| 2,802,658 | Hensgen | Aug. 13, 1957 |
| 2,880,985 | Roberts | Apr. 7, 1959 |
| 2,950,894 | Hillman | Aug. 30, 1960 |
| 3,058,536 | Thomson | Oct. 12, 1962 |

FOREIGN PATENTS

| | | |
|---|---|---|
| 621,315 | Germany | Nov. 5, 1935 |